Sept. 25, 1934.   H. N. SHEPPARD   1,974,473
MACHINE FOR MAKING PATTERNED KNIT FABRICS
Filed March 18, 1931   7 Sheets-Sheet 1
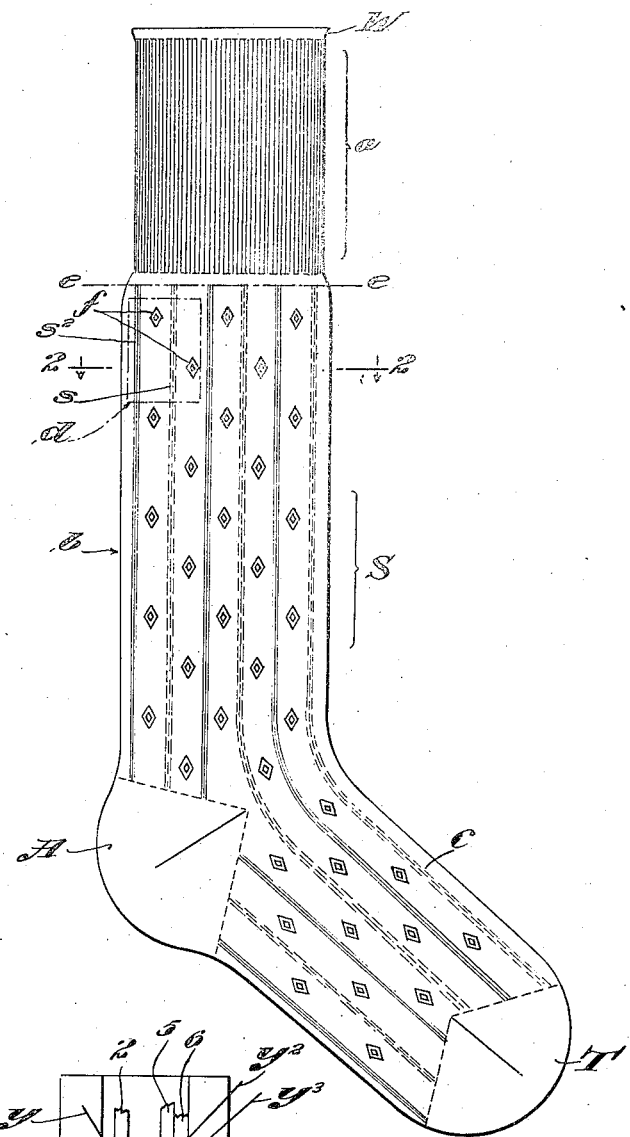
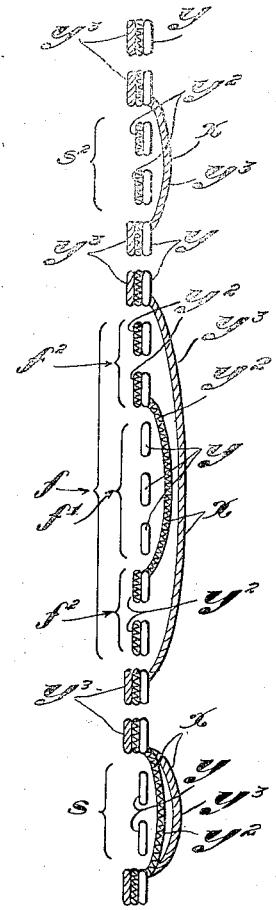
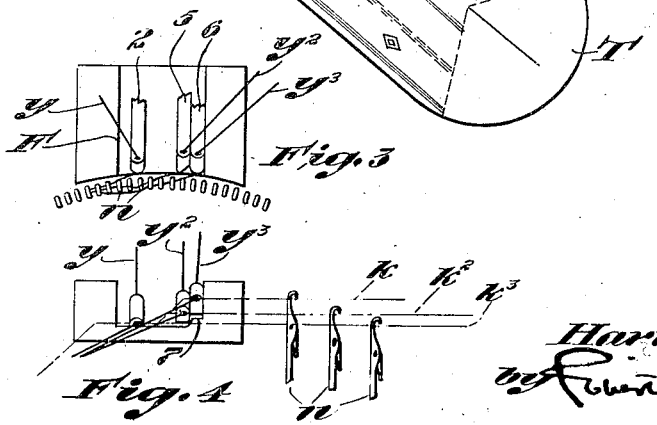
Inventor
Harry N. Sheppard
his Attorneys Sept. 25, 1934.   H. N. SHEPPARD   1,974,473
MACHINE FOR MAKING PATTERNED KNIT FABRICS
Filed March 18, 1931    7 Sheets-Sheet 2

Inventor
Harry N. Sheppard
by Roberts, Cushman & Woodberry
his Attorneys

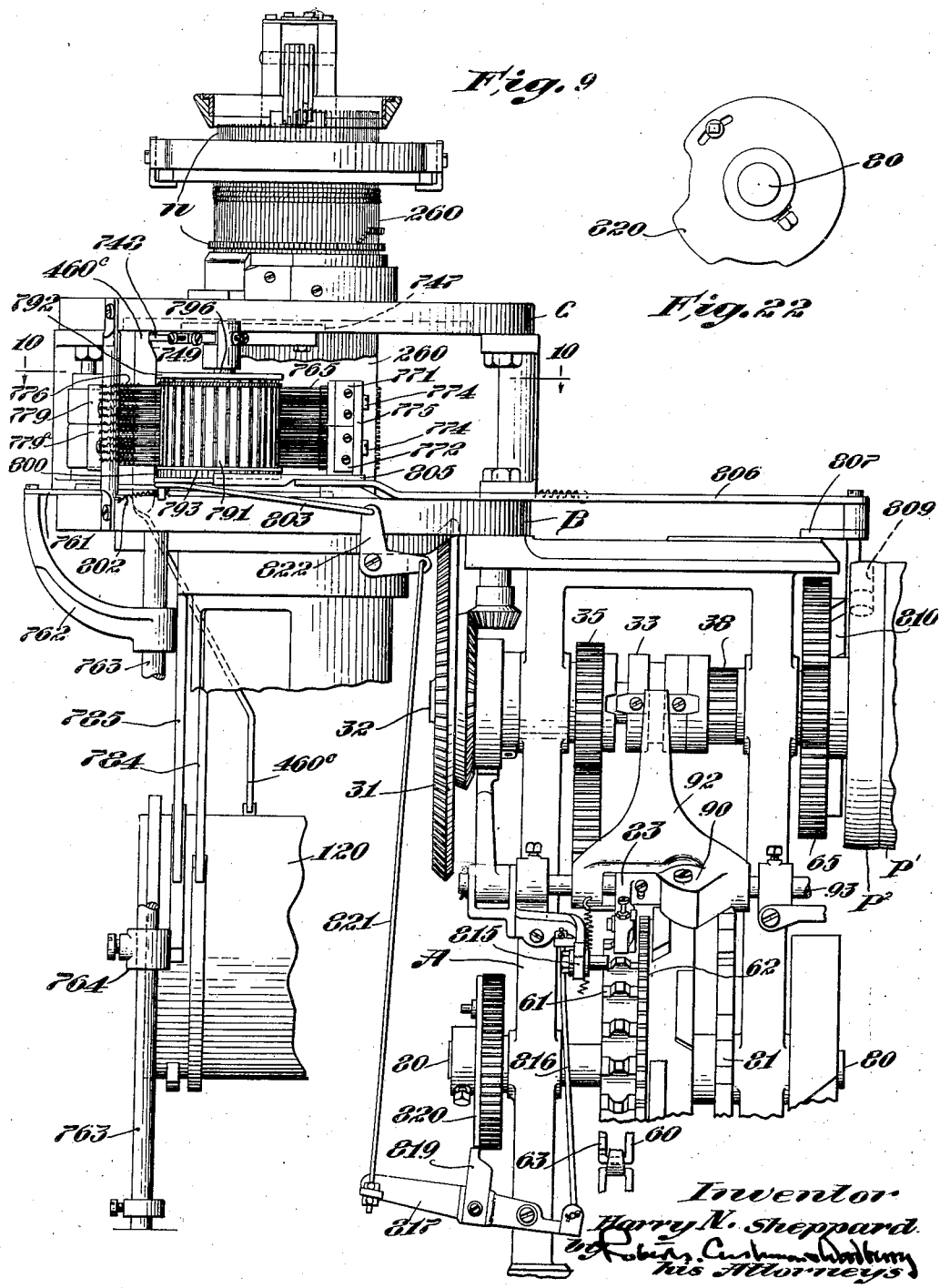

Sept. 25, 1934.    H. N. SHEPPARD    1,974,473
MACHINE FOR MAKING PATTERNED KNIT FABRICS
Filed March 18, 1931    7 Sheets-Sheet 4
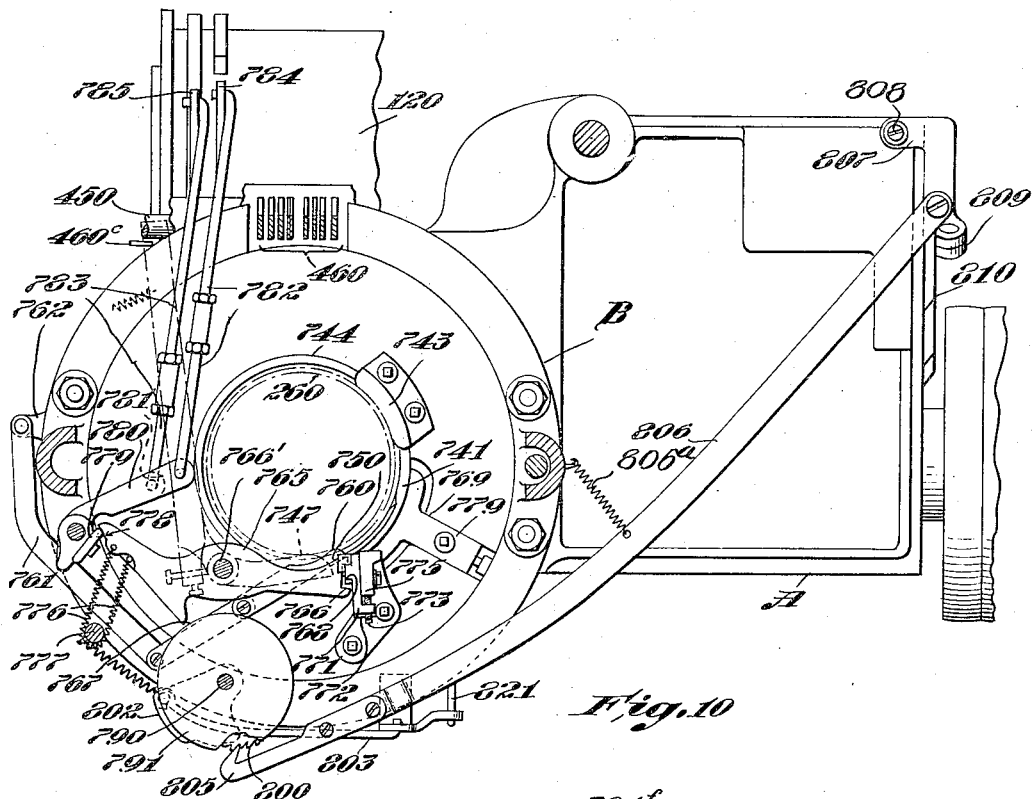
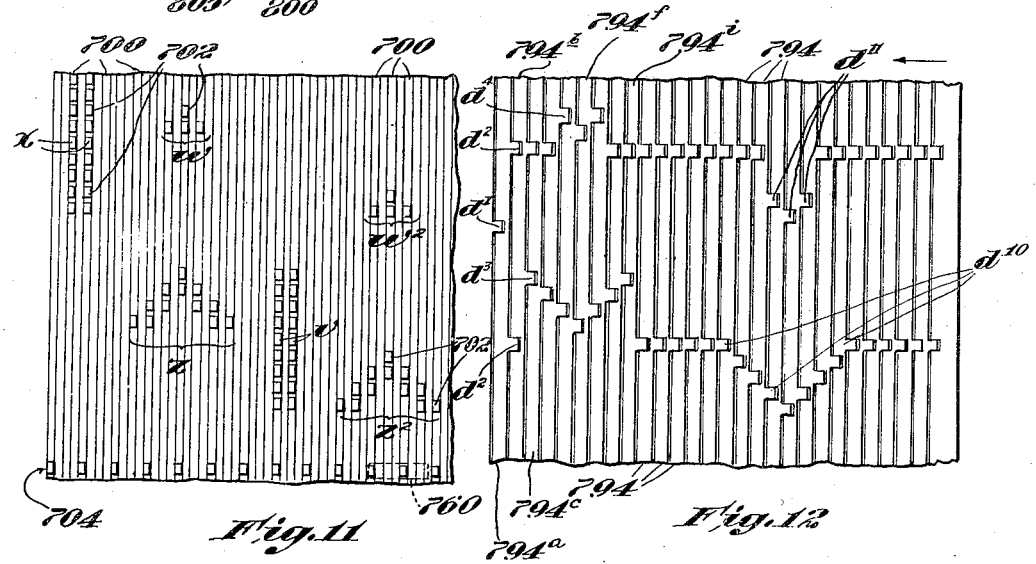
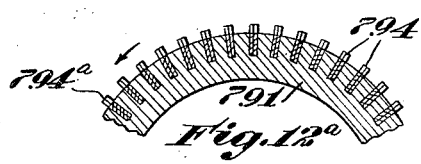
Inventor
Harry N. Sheppard
his Attorneys Sept. 25, 1934.    H. N. SHEPPARD    1,974,473
MACHINE FOR MAKING PATTERNED KNIT FABRICS
Filed March 18, 1931    7 Sheets-Sheet 5
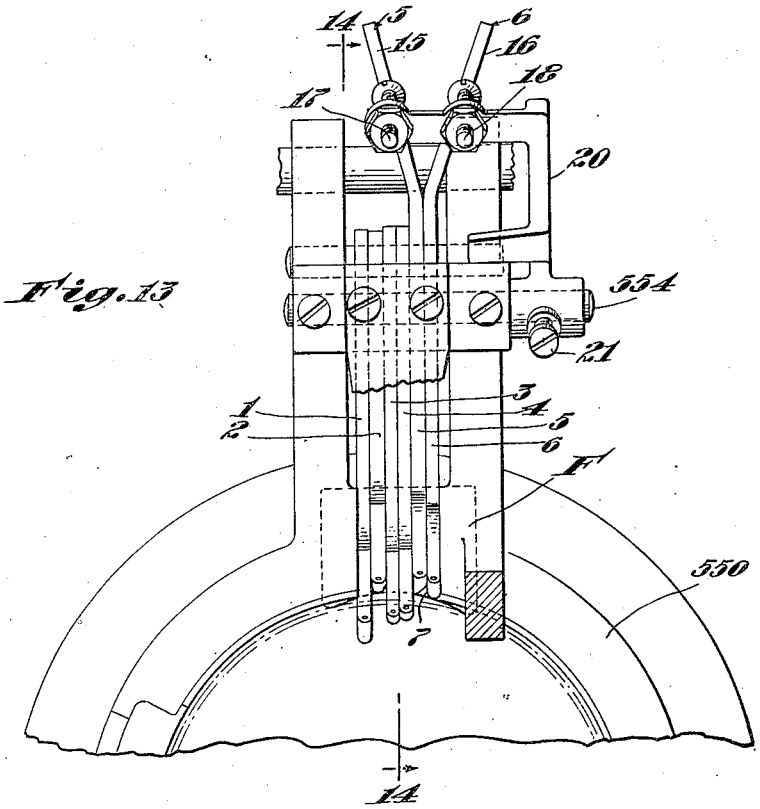
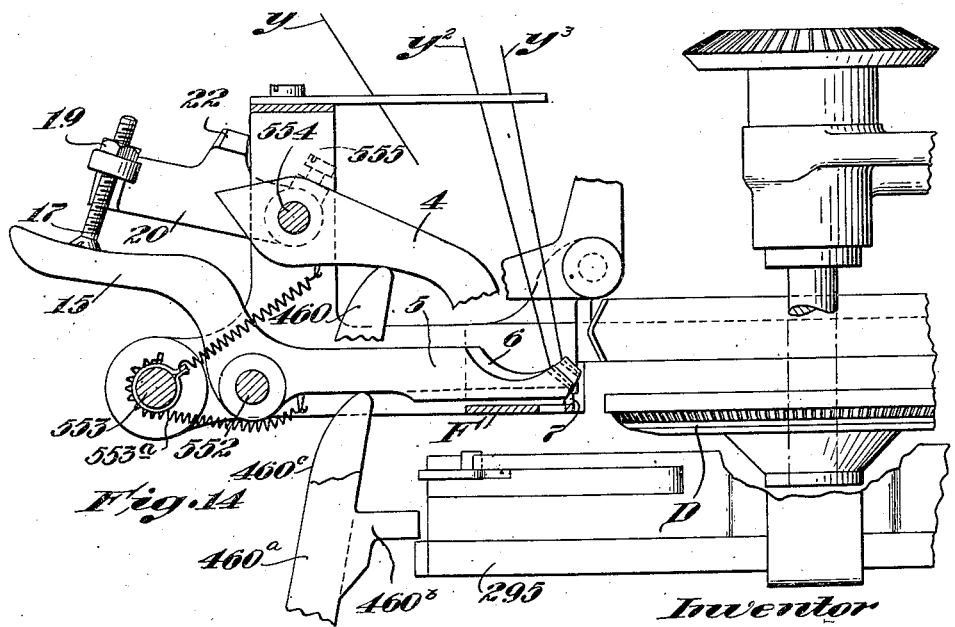

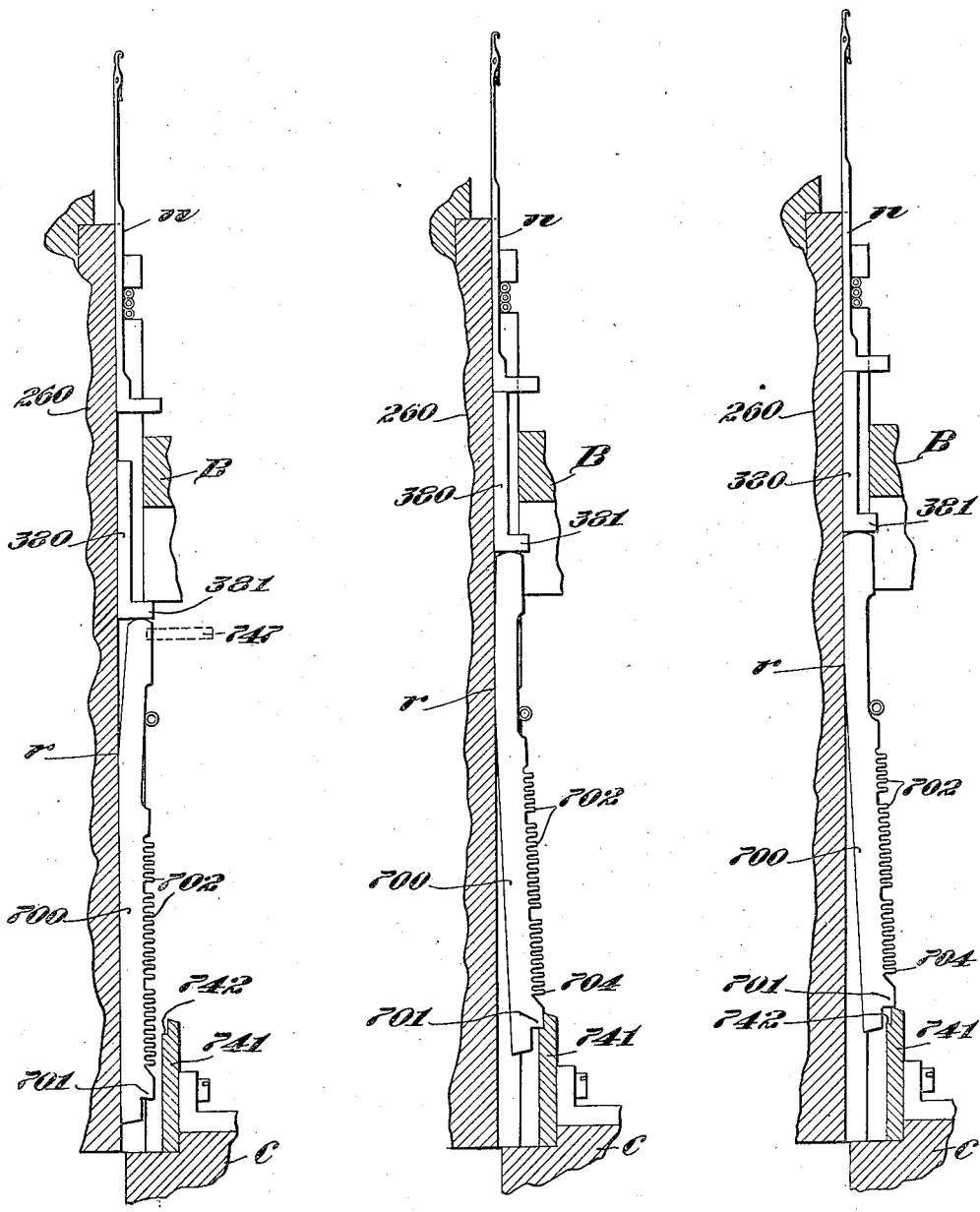

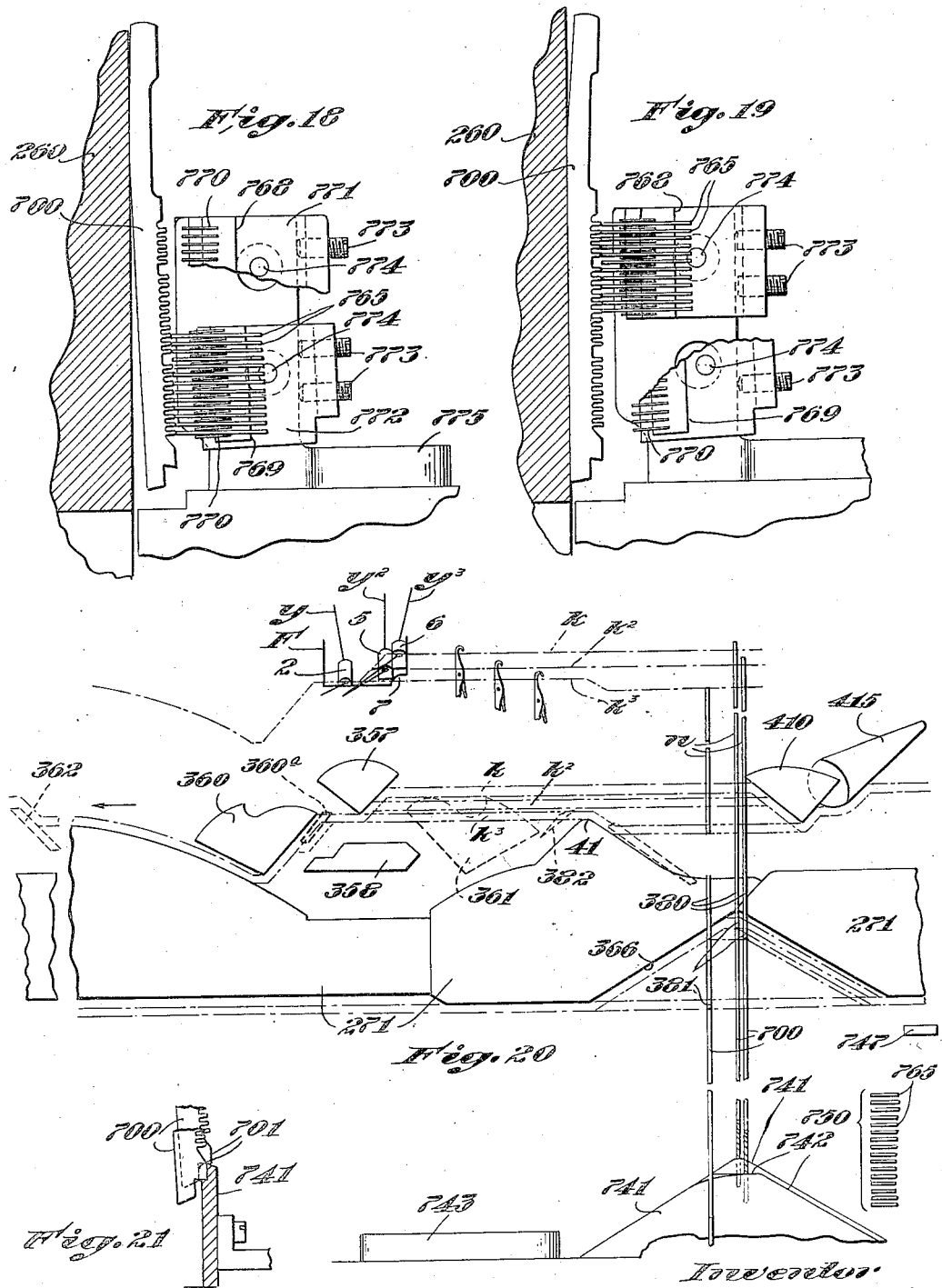

Patented Sept. 25, 1934

1,974,473

UNITED STATES PATENT OFFICE 1,974,473

MACHINE FOR MAKING PATTERNED KNIT FABRICS

Harry N. Sheppard, Maplewood, N. J., assignor to Scott & Williams, Incorporated, New York, N. Y., a corporation of Massachusetts Application March 18, 1931, Serial No. 523,467

28 Claims. (Cl. 66—50)

This invention relates to knit fabrics suitable for hosiery ornamented by patterns, especially patterns produced by plating and by floating certain yarns; to a mode of knitting such fabrics; and to mechanism by which the method or art can be practiced and articles of hosiery produced according to the remainder of the invention.

One object of this invention is to provide for the manufacture of fabrics, which may be relatively complete stockings having any usual welts, tops, heels and toes, sole or heel reinforcements, spliced areas, or other characteristic structures, which shall also have therein ornamental patterns obtained by causing withdrawal from and reappearance on the face surface of the fabric of face loops of yarns of either or all of two or more different colors or kinds, so that the stocking may have a pattern comprised in any course at any part of said course of loops of the color or texture of its structural or body yarn, or of the color or texture of one or of the other of at least two other yarns; or of both of said effects. Another object is to improve the certainty, accuracy and permanence in a knit fabric of changes in the relation of the component yarns relied upon for the ornamental pattern.

A further object of the invention is to provide for accomplishing these results by changes in existing mechanism resulting in modification of the operation of existing machines having devices for discriminating among needles in such a way as to select needles to take, according to a predetermined pattern, any one of at least three different paths in relation to devices for feeding them with yarn, while in operative relation to knitting cams and to usual knocking-over instruments at the verge of the needle carrier. A further object of this invention is to increase the accuracy and enlarge the capacity of devices for performing a selection among needles in a knitting machine for the purpose of making patterns in the fabric by change in the structure and surface color of knit loops according to the indications of a mutable pattern surface or surfaces.

Ornamental patterns capable of being made on knitting machines producing tubular or circular knit stockings have heretofore included embroidery, variations by reversals of yarns in plated fabrics, stripe patterns made by exchanges of a yarn for a yarn of a different color or kind; patterns made by textural variations of the fabric such as tucked stitches, draw stitches, transferred-loop eyelet holes, enlarged stitches, or drop-stitch wales; and patterns made by floating one of the component yarns at the back of the fabric to display a ground or body color on the face of the fabric. Fabrics having patterns made by floating a yarn, elsewhere knit, at the back of the fabric are satisfactory in respect to accuracy of definition of the areas of different color constituting the pattern, and structurally sound in respect to the continuity of the main or body yarn loops; but so far as I am aware, heretofore such patterns capable of being made on hosiery machines have been limited to the appearance on the surface and removal to float at the back of one kind of yarn only, and therefore have lacked the range of variation of color suitable for the most desirable merchandise. This invention provides for making hosiery fabrics with ornament resulting from pattern-controlled withdrawals to float, at any stitch in any course or wale, of yarns of a series comprising at least two of three or more colors or kinds of yarn of which the fabric is composed. When I refer to patterns comprised of two or three colors or kinds of yarn, I do not exclude hosiery fabrics also having elements of pattern made according to any of the modes and having any of the structural or color changes of the prior art heretofore resorted to for ornament. The fabric of this invention may be made and the art or method of this invention practiced without disturbance of the making of other structural or color changes in the fabric according to the prior art and within my invention.

The invention will be described as exemplified in connection with the construction, operation and product of machines of the well-known Scott & Williams type, for example, as built under the United States patents to Robert W. Scott, No. 1,148,055, dated July 27, 1915; No. 1,282,958, dated October 29, 1918; No. 1,256,062, dated February 12, 1918; and No. 1,237,256, dated August 14, 1917; and under the United States patent to I. W. Grothey, No. 1,678,385, dated July 24, 1928, and improvements thereon described in the applications of Albert E. Page, Serial No. 359,962, filed May 2, 1929; and Serial No. 389,383, filed August 29, 1929; but the invention is capable of practice in relation to knitting machines of other types, and reference to machines of said type is for the purpose of explanation and illustration rather than by way of limitation to the kind of knitting machine thereby indicated.

In the accompanying drawings:

Fig. 1 is a conventional side elevation of a typical stocking, shown as a sock or half hose, made according to the invention;

Fig. 2 is an enlarged end or plan view of a typical course of the knit fabric of said stocking at a part ornamented by the decorative pattern, for example on the line 2—2 of Fig. 1;

Fig. 3 is a detail in plan and Fig. 4 is a diagram elevation showing a preferred operative relation of certain yarn guides to needles travelling in certain paths;

Fig. 9 is a front elevation showing parts of a machine of said Scott & Williams type provided with the devices of this invention;

Fig. 10 is a plan partly in section on line 10—10 of Fig. 9;

Fig. 11 is an exterior detail development of a series of pattern jacks for a particular pattern;

Fig. 12 is a detail elevation, displayed, of a corresponding series of pattern drum bits;

Fig. 12a is a detail horizontal section of the selector pattern drum;

Fig. 13 is a detail plan above the latch ring and yarn feed guides;

Fig. 14 is a vertical elevation partly in section on line 14—14 of Fig. 13;

Figs. 15, 16 and 17 are sections on radial planes of the needle carrier showing respectively needles and jacks in position for knitting body yarn only, for knitting a body yarn and plating yarn while floating a plating yarn; and for knitting a body yarn and two plating yarns;

Figs. 18 and 19 are detail elevations on a vertical radial plane of the needle cylinder showing the coaction of guides and stops for reader levers with jacks in two different operative positions;

Fig. 20 is an internal development showing the relation of needle and jack cams and yarn-feed guides to needles and jacks;

Fig. 21 is a detail section on line 21—21 of Fig. 20 showing jacks pattern-selected to reach different elevations; and Fig. 22 is a detail left-side elevation of a part shown in Fig. 9.

Referring to Figs. 1 to 8 inclusive, the new stocking S may be a stocking suitable for any kind of use, illustrated as a sock or half-hose of the seamless or circularly-knit kind, having a welt W and top $a$, which may be a ribbed top; having a plain knit seamless leg $b$, a tubular seamless foot $c$, and the usual reciprocally knit heel H and toe T, which may, as usual, be formed of a heavier yarn, or reinforced by a splicing yarn supplied and interknit as usual. Any desired spliced area (not shown) may be formed at other usual places in the stocking in the usual way.

The leg $b$, foot $c$, and, if desired, the top $a$, are ornamented by a pattern in colors. In the instance shown, the pattern comprises repeated recurrences throughout the leg and foot of the variations within the area $d$, Fig. 1, in which is a figure which may be a longitudinal stripe $s$ of the color of the structural or body yarn $y$, which yarn is continuous throughout the leg and foot; a figure which may be a longitudinal stripe $s^2$ of the color of a yarn $y^2$ plated on the body yarn; and an additional element of ornament shown as a symmetrical lozenge-shaped repeated figure $f$ characterized by a center $f'$ of the body-color surrounded by a lozenge-shaped area $f^2$ of the yarn $y^2$ plated on the face of the loops of the body yarn $y$; whereas the general background of the fabric is of the color of a second plating yarn $y^3$ plated on the loops of yarn $y^2$, in turn plated on the loops of yarn $y$.

The figure $f$ is shown repeated in different wales at a following group of courses within the area $d$, which may include any desired number of wales, and any number of courses within the capacity of the needle selecting devices presently explained, so that the figures $f$ may be arranged as desired, in the instance shown, as an incident of repeats of the area $d$. Whenever the yarns $y^2$ and $y^3$ do not appear on the face of the fabric, they pass to the back of the fabric, out of the needle-loops, to float as at $x$, Fig. 2.

Figure 6:
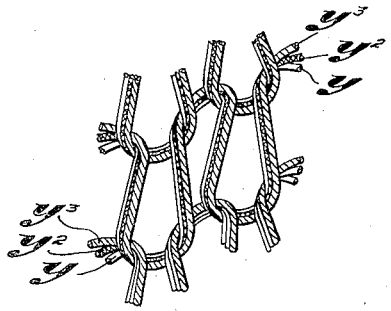
Figs. 6, 7 and 8 are perspective views of different kinds of fabric relied upon in conjunction to produce the kind of ornamental effect referred to according to the distribution of fabric of said kinds in the product.
Figure 7:
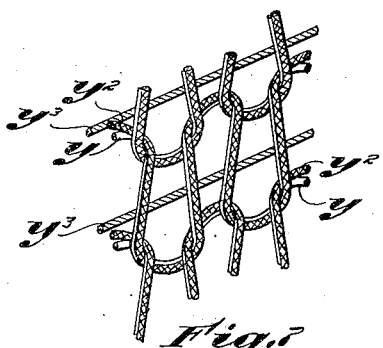
Figure 8:
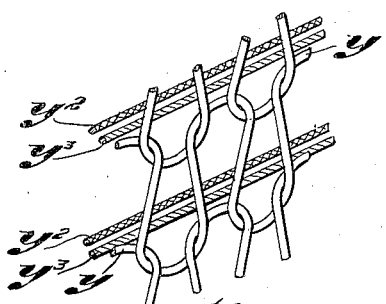

The simple pattern illustrated is an example of a great variety of different patterns capable of being made according to this method. The stripes $s$ and $s^2$ may be intermittent, or omitted; may recur in different numbers, or in alternate groups of courses, or alternately in different wales, or be broken up into shaped spots. The figures $f$ may take any form within the ingenuity of the designer which can be expressed by shifts from the color of yarn $y^3$ to the colors respectively of the body yarn $y$ and the plating yarn $y^2$. This capacity or flexibility in the particular kind of pattern is a consequence of a method of knitting the fabric now to be explained in and by which a knit fabric made of a body yarn $y$ only, see Fig. 8; or of the body yarn $y$ plated upon by the plating yarn $y^2$, see Fig. 7; or of the body yarn $y$ and plating yarn $y^2$ plated upon by the plating yarn $y^3$, see Fig. 6, can be made automatically according to a variable pattern in any course or group of courses of the fabrics at any needle wale or wales, the yarn or yarns not in use, if any, in these several kinds of fabric, extending as free floats at the back of the fabric (Figs. 2, 7 and 8). These floats may be sheared off, if desired, in the finished article.

A knit fabric so made varies in thickness according to the color of its surface, comprising an integrally continuous fabric of a body yarn (the yarn $y$) integrally conjoined at patterned areas with fabric of said yarn and another yarn (the yarn $y^2$) in plating relation to the body yarn; and integrally conjoined at other areas with fabric of said body yarn and plating yarn overlaid by a third yarn (the yarn $y^3$) in plating relation.

Referring now to Figs. 3, 4, 13, 14 and 20, a patterned fabric of the kind explained may be made by causing the respective yarns $y$, $y^2$, $y^3$ to be supplied during making of the patterned fabric to needles moving past guides severally for these yarns in a certain relative position to each other, the passing series of hooked needles $n$, shown as latch needles, respectively bearing upon their shanks and beneath their latches loops of yarn of the last previous course; the needles severally being positioned in relation to the yarn guides, respectively, to receive all of the yarns in their hooks; or in a position to receive two of the yarns and to pass in front of one of them (yarn $y^3$); or in a position to receive one of them (yarn $y$) and to pass in front of two of them (yarns $y^2$ and $y^3$); and by thereafter actuating these needles in relation to the verge of their carrier or other knocking-over instruments to knit.

The same operations might be performed by equivalent means which will be obvious to those skilled in the art; but preferred practice is upon the kind of machine shown, in which the needles are movable in succession to receive yarn and in the direction of their lengths to knit and clear their latches. It is preferred therefore to clear the previous loops on the needles, to position selected needles at different levels, and then to cause the needles to pass yarn guides for yarns $y$, $y^2$ and $y^3$, each guide at a different level and different distance ahead of the place of motion of the needles to knit for the purpose of receiving at the yarn guides one yarn only, two yarns, or three yarns; and then to move the needles to knit. The operation of the needles to receive yarn according to the pattern to be knit is independent of any alteration of the position of the yarn in the needle hooks after their contact with the yarn, and the needle-carrier verge, the web-holders or sinkers, not shown, may bear any usual constant operative relation to the needles and knitting cams. But, if desired, patterns additional to or in modification of the pattern distribution of the yarns herein described may be made by variation of the relation of sinkers or web-holders to the entering yarns by known devices without alteration of practice of the present method or necessary change of its result in the fabric formed.

Referring to Figs. 3, 4, 13, and 14, a preferred way of feeding yarn to the needles comprises resort to a series of yarn fingers 1, 2, 3, 4, 5, 6, shown as six, movable into and out of a yarn-feed throat F of which fingers 1, 3 and 4 are not necessarily concerned in presenting yarns $y$, $y^2$ or $y^3$ to the needles $n$, but are reserved for other operations; for example, finger 1 may carry a splicing yarn or a yarn to be exchanged at times for yarn $y$; finger 3 may carry a yarn to be exchanged at times for yarn $y$, and finger 4 may carry a yarn or yarns to be used during reciprocal knitting. Finger 2, in a usual relative position to the needles and the down-going phase of motion at a stitch cam, may carry the body yarn $y$, which is fed by it from a low level and relatively short lead or distance in advance of the down-going phase of the motion of the needles to knit. All needles take the yarn $y$ into their hooks, and in respect to yarns knitting the leg $b$ and foot $c$ of the stocking, the yarn $y$ is the last yarn laid in the needle-hooks, unless a splicing yarn is fed from finger 1. Yarn $y^2$ is fed from a higher position and greater lead than yarn $y$, for example from finger 5 having a yarn delivery eye standing above the bottom of feed throat F. Yarn $y^3$ is fed from a still greater lead, and still higher position, than $y^2$.

The needles are caused to approach the respective guides for yarns $y^3$ and $y^2$ and $y$ at the different levels $k$, $k^2$ and $k^3$, Figs. 4 and 20, and immediately after passage by the finger 6, needles passing at a high or super-normal level $k$ are lowered to an intermediate or second super-normal level $k^2$; immediately after passing finger 5, needles at level $k^2$ and those which have been lowered from level $k$ are further lowered to the normal level $k^3$; so that all needles pass finger 2 for yarn $y$ at level $k^3$, at which level they remain until moved downward to knit. As shown in Figs. 3 and 4, a yarn fed at 5 or 6 will not enter a needle whose hook is not above the level of delivery of said yarn at passage of the needle, but will pass behind a needle or needles in a lower position when there is a retraction of the needles occurring during passage by the fingers between 6 and 2. Such a retraction may be caused as a function of the leading slope of a top center cam 357, Fig. 20, in a line parallel to which the needles begin their retraction from level $k$ after having passed guide finger 6; or begin their retraction from level $k^2$ after having passed guide finger 5; whereas further retraction to knit from level $k^3$ does not occur until all of the needles have passed guide finger 2.

The stocking S of Fig. 1 may be knit in any usual way from the top to the line $e$—$e$ of Fig. 1. The needles are then acted upon to clear their previous loops below their latches prior to reaching the yarn-guides, and are acted upon independently and selectively to determine the level $k^3$, $k^2$ or $k$ at which each needle shall pass the yarn guides. Normally, the needles are all positioned at level $k^3$ by the operation of known machine devices. According to this invention, needles to knit a fabric of two yarns in plating relation, as in Fig. 7, are selectively raised to level $k^2$; and needles which are to knit a fabric of three yarns in plating relation, as in Fig. 6, are selectively raised to level $k$. These operations occur at each course knit, and affect any desired needle of the circular series of needles $n$ in the preferred kind of machine for carrying out the method and producing the product.

Referring now to Figs. 9 to 21 inclusive, the machine may be a circular machine and comprise in the preferred form devices for all of the usual stocking knitting functions; for example, for making in separate succession stockings having an integral inturned welt or hem, or an integral ribbed top; the product may have any of the usual features of knit stockings including a leg fashioned by variation of stitch length, having usual areas of reinforced or spliced fabric, and having reciprocally knit narrowed and widened heels and toes of any desired particular construction. In general the machine comprises a frame A, Figs. 9 and 10, housing driving and motion changing devices, primary and main pattern surfaces, which frame may support an overhanging bed plate B having a horizontal needle carrier driver bevel gear, not shown, bearing therein and providing a splined sleeve mounting for the needle carrier. Bed plate B provides a mounting for selector device operating means, and may in turn support an annular bed plate C carrying the usual needle-controlling cams, cam-ring, picker mechanism, web-holder control mechanism, and yarn-feeding devices, appurtenant to the particular kind of hosiery or other machine to which this invention may be applied.

The grooved needle carrier 260, Figs. 9, 15, 16, 17, 18 and 19, is a longer cylinder than usual for circular knitting machine needle carriers, providing in each of its tricks or grooves for the usual needles $n$, which may be any kind of needles shown as latch needles having their hooks forward of the rear line of their shanks; for needle jacks 380 having operating butts 381; and for selector or pattern jacks 700, which may be jacks having a rocking point at $r$ on their backs and operating butts 701, presently more particularly described. The selector jacks 700 are in the lower part of the carrier 260 exposed between the bed plates B and C, where these jacks are desirably positioned to be operated upon by instruments mounted on and in the space between said bed plates. The usual instruments for hosiery machine needle control carried by the annular bed plate C may operate in their old relation, except as herein mentioned. The needles and web-holders, not shown, work in the upper part of the carrier cylinder 260. The machine may have, as usual, supported above the bed plate C, the usual latch ring structure, the usual instrument dial and its supporting and driving devices; the usual yarn feed fingers for yarns supported, guided, tensioned, etc., in the usual overhead bracket and devices mounted on a standard carried by the frame. As customary, the activities of the machine are in the first instance controlled by a primary pattern surface made as a mutable link chain 60, Fig. 9, on a sprocket 61 integral with or attached to a ratchet 62 loose on main pattern shaft 80, moved forward by a pawl, not shown, one tooth at each several, for example four, revolutions of the main shaft 32 carrying the driving bevel gear 31 for the needle cylinder. Shaft 80 carries drum 90 for shifting a yoke 92 on slide rod 93 and clutch element 33 to connect shaft 32 to either the reciprocally driven pinion 35 or the rotary pinion 38, which latter may be driven by a tubular axle from pulley P', or indirectly at an increased speed by gearing to pulley P², all as usual. Motions of shaft 80 and drum 120, geared to it, are a consequence of the coaction of a reciprocating pawl, not shown, with rack-wheel 81, as determined by a rocking pawl controller 83 on slide rod 93 which controller is in turn positioned by lugs on the right hand side of links of the chain 60. The chain 60 is for the present purposes provided with a series of lugs 63 on its mutable links corresponding to places in the length of the fabric at which the pattern devices are to be stopped when knitting patterned fabric is to cease.

Cams mounted directly on and rotating with the main pattern surface represented by the shaft 80 and its adjuncts, such as various kinds of cams mounted on the drum 120 for motion in unison with the shaft 80, reacting with levers or thrust-bars 460, are relied upon for the automatic control of the usual cam, yarn-guide finger and other devices at the knitting head or above the bed plate C for the usual activities of the machine in knitting a stocking. Shaft 80 and the drum 120 turn through one whole revolution in the production of each article.

This machine is particularly well adapted to knit structural patterns comprising distributed stitches containing floats of yarns caused to pass to the back of the fabric, which fabric may comprise at this stitch a normal or a tucked loop of a yarn or yarns operatively taken by a needle; or patterns containing wales or series of missed stitches; or patterns having normal areas of plated fabric ornamented by patterns of stitches of the concealed yarn or yarns of the plated structure, made as the result of floating one or more of the plating yarns behind a stitch of the body or normally-concealed yarn or yarns.

All of the desirable conditions for patterning the fabric are satisfied by providing for a pattern controlled separation of a selected needle from its normal path, to take one or the other of a plurality of different paths, for the purpose of taking less than all of and missing operative contact with other yarns; or of taking all of a multiple series of yarns to be knit in plating relation when taken, and floated at the back of the fabric when missed, at the next passage by a stitch cam. A selected needle may thus take one, two or more yarns, and pass in front of the other yarns of a multiple series of yarns placed on the needle in plating relation when taken. By appropriate provision of cam paths and selecting means according to this invention, any of these operations will follow as a consequence of providing for lifting selected needles $n$ to different extents as controlled by pattern-actuated selector devices acting at a point ahead of the stitch-cam and place of yarn feed. As shown, the multiple series of yarns comprises the yarns $y^2$ and $y^3$, in addition to the body yarn $y$, and needle selection determines sending the needles to one or the other of two different levels above normal.

For example, referring now to Figs. 13, 14 and 20, usual stitch cams 360 and 361 with top center cam 357 and, if desired, a bottom center cam 358, may be provided for rotary and reciprocatory knitting, as usual in conjunction with riser cams on cam ring 271 lifting the butts of needles $n$ at 41 to the tuck point, at which previous loops are not cleared below the latches. A switch cam 415 and guard cam 410 may serve the usual stocking-knitting purposes and provide means for lowering lifted needles into range of the part 41 of ring 271. A dividing cam 382 may upon occasion be moved into contact with butts of needles $n$ to switch them below the leading stitch cam 361 and center cam 358, whereupon the needles pass yarns fed from any of the fingers 1, 2, 3, 4, 5, 6 of the series of yarn feed fingers in throat F without contact with the new yarn until after passing the lower apex of cam 360. Cam 361 and cam 382 may be severally removed radially out of contact with the butts of needles $n$. When so moved, needles passing at 41 retain their level at tuck position shown at $k^3$ until they contact with the face of stitch cam 360 (or a supplemental cam 360ª which may be inserted to depress needles having longer butts at an earlier time). In respect to any main or body yarn fed by fingers 1, 2, 3, or 4, all needles passing at level $k^3$ or in a more elevated position can take that yarn. When needles travel in path $k^3$ they do not, however, operatively take a plating yarn fed at a considerable lead, or from a higher position, as from finger 5, or finger 6, but are fed with any main or splicing yarn from fingers 1, 2 or 3. Needles lifted to level $k^2$ take yarns $y$ and $y^2$ in plating relation to each other, and miss yarn $y^3$.

Stitches made at needles passing at level $k^3$ pass in front of an internal float of yarn from finger 5, or yarns from fingers 5 and 6, behind a face loop of body yarn from fingers 1, 2, 3, or 4. Needles at the level $k^2$ pass in front of an internal float of yarn $y^3$ behind loops of yarns $y$ and $y^2$; if these needles have had their latches cleared, these loops are ordinary loops; if they are cleared at intervals of several courses, they are tucked loops; if the latches have been cleared and the cam 382 adjusted to cause the needles to pass under the leading stitch cam 361, these needles may drop their stitches. The machine improved provides a movable clearing cam 362 usually in operation ahead of switch cam 415 to cause the needle latches to be cleared through the previous loops, and when this cam is in use needles taking the path $k^3$ knit fabric of any yarn, such as $y$, fed from fingers 1, 2, or 3 (Fig. 8) whereas any needles lifted to level $k^2$ make loops of said yarn regularly plated on their faces with yarn $y^2$ from finger 5 (Fig. 7); and needles lifted to level $k$ knit loops of yarn $y$ regularly plated on their faces with loops of yarn $y^3$ overlying loops of yarn $y^2$. The cams 361, 362 and 382 are automatically operated by usual connections, not shown, to the main pattern surface 120.

The needles are lifted to the several levels $k$ and $k^2$ by the operation of the needle jacks 380 moved by the selector jacks 700, worked as shown in Figs. 10, 15, 16, 17 and 20, by a jack lifting cam 741 on bed B, concentric with but spaced outward from cylinder 260, which cam may be beveled to engage beneath the undercut operating butts 701 of selector jacks 700, to raise or advance outwardly swung jacks 700 which reach it in the position of Fig. 17, whereupon these jacks 700 lift the needle jacks 380 and needles to path $k$. If cam 361 is then in operative position, this motion of the jacks 700 is without result, since all the needles reach path $k$ before the feeding point by rising along the top surface of cam 361. Before the jacks 700 reach the cam 741, their lower ends are rocked outwardly by a cam arm 747, Figs. 9 and 10, (worked by thrust bar 460$^c$ having a cam notch 749 against arm 748 rigid with arm 747) and they are thereafter acted upon selectively to return those selector jacks corresponding to needles not to be lifted above level $k^3$ out of reach of cam 741 by reader cam levers 765, Figs. 9, 10 and 20, having cam ends 750 effective ahead of the position of cam 741. Elsewhere than opposite cams 741, 747 and 765, the jacks 700 may be held in the position of Fig. 15 by a ring 744 having at its leading end a cam 743 to push the lower ends of displaced jacks inwardly. The jacks 700 may be laterally bent and spring-tempered to remain where adjusted in their grooves by friction.

The cam 741, see Fig. 20, provides a full profile capable of lifting the jacks 700, the jacks 380 and their corresponding needles to the level $k$.

The cam 741 is also provided with an interior ledge or channel 742, Figs. 10, 16, 20 and 21, having an apex at a lesser height capable of lifting jacks 700 rocked into an intermediate position between jacks placed as in Fig. 17 and jacks placed as in Fig. 15 to cause the needles associated with them to reach the level $k^2$ only.

The selector jacks 700 are prepared for selection by causing them to be rocked about their points $r$ to different radial positions in their grooves in carrier 260 by providing them with a series, in this instance twenty-five, of selector butts 702, extending from above the operating butt 701 to a point below the rocking point $r$. The operation of the following slope 366 of ring 271 on the butts of jacks 380 levels the selector jacks 700 at a point ahead of the cam 741. Butts 702 are removed where desired on the selector jacks for each needle, so as to provide any desirable series at any of, for example, twenty-five different levels of butts, or butt spaces having no butt, for the selection of needles not to be advanced to levels $k^2$ or $k$, respectively. Obviously a reader cam 765, 750 at the level of a butt 702 may cause the jack 700 to be moved inward to pass cam 741 without being lifted, or move it so far inward only as to cause it to pass up the ledge 742. If butts at the same relative position on any series of the jacks 700 are removed, a reader cam at the level of these butts will not operate these jacks, which will rise at cam 741; but these jacks may be moved inward away from cam 741 by any of their other butts.

Likewise, if it shall be provided to act upon the butts of the jacks by a reader cam operating ahead of the cam 741 in such a way as to push the outwardly rocked jacks inward so far as to miss the leading edge of the cam 741, but not far enough to miss the track 742 of the cam 741, the result will be to cause the jacks in this intermediate position, see Fig. 16 and Fig. 21, to rise at the cam 742 to an intermediate position, sufficient to lift their needle jacks 380 and needles $n$ to the intermediate level $k^2$.

The lowest butts 704 may be present on alternate jacks only, and may be operated upon by the cam end of a lever 760 pivoted on bed B for the purpose, in connection with dividing cam 382, Fig. 20, of sending alternate needles under the stitch cams for making starting selvages, to permit ribbing, and for other purposes having to do with the structure of the products familiar to users of the said Scott & Williams machines. Lever 760 may be worked automatically at proper times, Figs. 9 and 10, by a link 761, arm 762, vertical shaft 763 and arm 764 taking against a cam surface on the end of main pattern drum 120.

Opposite the levels of the respective butts 702, the series of pattern indication transmission devices, Figs. 9, 10, 18, 19, referred to as reader cam levers 765, are pivoted in horizontal planes on a vertical shaft 766′ extending between bed plates B and C, and provided with cam ends at 750 and recesses at 766 to straddle one of the vertical stops 768, 769 milled to receive spacer and guide inserts 770 for the reader cam levers, these parts being integral with or attached to separately adjustable plates 771, 772 having set screws at 773 and holding screws 774 in enlarged holes in a standard 775 fastened on bed plate B, to adjust the cam ends 750 of levers 765 to the selector jack butt levels, and severally adjust the stops 768, 769 to limit inward motion of ends 750 to degrees of inward thrust on the selector jack butts suitable severally to cause the operating butts 701 to miss contact with cam 741; or to ride on the ledge 742, when a butt 702 is in the plane of a reader cam lever 765 positioned inwardly in contact with stop 768 or stop 769. For accuracy, if the series of butts 702 on the lower portions of the space for butts on jacks 700 is relied upon to work the jacks to take or not to take the cam path 742, the preferred position of plate 772 and stop 769 is parallel with the intermediate outwardly-rocked position for jacks 700; Figs. 16 and 18. The effect of this is to cause any lever 765 released to be moved inwardly by its springs 776, to be positioned by its surface 766 against stop 769, reliably to act upon any butt 702 on the lower halves of the series of jacks 700 to push the jacks inward far enough and only far enough to encounter edge 742. Since the inward thrust on jacks 700 which are not to be lifted at all need not be so accurate, it is appropriate to employ for this purpose butts 702 spaced nearer the rocking points $r$, and actuate these by the upper members of the series of levers 765, brought against their stop 768, Fig. 19, which may be set further in and nearly or quite vertical.

Levers 765 have operating lugs 767 and staggered holes in alternate levers for the tension springs 776 connected in pairs around a vertical bar 777 having a lower end screwed on the face of bed B. Each of the levers 765 has a tail surface at 778 held by the springs 776 toward a vertical plate 779 or 779$^a$ each fastened on a control lever of a series 780, 781, shown as two, pivoted one above the other on a vertical stud between beds B and C. The plates 779, 779$^a$ are for severally holding out of action a series of the reader cam levers less than the whole series, and there may be as many such plates and levers 780, 781 as desired.

Levers 780, 781 may be connected to be operated by any existing pattern surface of the machine at different parts of the stocking, as by links 782, 783 respectively to vertical indicator levers 784, 785 horizontally pivoted on a stud 450, Fig. 10, and worked by cams on the main pattern surface of drum 120, or otherwise pattern operated. The levers 780 and 781 are normally inoperative when patterned fabric is being made, except as explained below.

The cam end 750 of each reader cam lever 765, unless it is held outwardly by one of the plates 779, 779ª or by the engagement of its lug 767 with a high part on drum 791, is forced inwardly by its individual spring 776 against stop 768 or 769 to rock any selector jack 700 having a butt 702 in its plane out of the way of cam 741, or out of the way of cams 741 and 742, and so to determine whether its needle will take yarns $y$, $y^2$ and $y^3$, or yarns $y$ and $y^2$, or yarn $y$ only. Each lever 765 may work in succession as many jacks passing it as there are needles in each course.

The reader cam levers are released to perform their function according to an automatically operated pattern. On a vertical stud 790, for example, erected on bed plate B, Figs. 9, 10, 12 and 12ª, there may be mounted for rotation a mutable auxiliary pattern surface for working the levers 765. A preferred construction as shown comprises a radially and longitudinally slotted drum 791 having heads 792 and 793, of which the lower may have an annular undercut, to receive one beveled end of an inserted bit 794 held in by a spring band, and having projecting faces with spaced depressions $d^1$, $d^2$, etc. to $d^{11}$, Fig. 12 respectively to receive one of the lugs 767 of the levers 765. A depression on one of these bits 794 releases a lever 765 at its level to select all jacks 700 having butts 702 at its level to make a pattern stitch on their needles, that is, to make the selected needle miss one or both of the yarns $y^2$, $y^3$.

The auxiliary pattern drum 791 is intermittently advanced under pattern control by any suitable means. Integral with or attached to the drum 791 is ratchet 800, for example, having as many teeth as there are slots and inserts 794, of which one tooth may be a low tooth. Also pivoted on the stud 790 a pawl guard 802 under ratchet 800 having concentric levels of three different radii is provided to be swung by a link 803 and a connection presently explained, to control the engagement of a hook pawl 805 on a link 806 held by spring 806ª against ratchet 800. Link 806 may be worked through a sufficient stroke by a rocker 807 pivoted at 808 on frame A, and having an anti-friction roll 809 in contact with cams 810 (Fig. 9) mounted in a concentric groove in the face of plate gear 65. There may be so many cams 810 as to move the pawl 805 once in every revolution of the needle cylinder, or a greater or lesser number. When the guard 802 is positioned with its surface of shortest radius opposite the pawl 805, the ratchet and drum 791 are continually driven. When the surface of intermediate radius is opposite the pawl, the ratchet stops when the low tooth is reached by the pawl. When the surface of greatest radius is opposite the pawl, the ratchet is held out of operative position. A suitable brake 796 may take against the top of drum 791 and be fastened to the upper end of stud 796.

The link 803 and pawl guard 802, motions of which control actuation of the auxiliary pattern drum 791, are preferably controlled by indications severally from both the primary pattern surface (chain 60) and from the main pattern surface (any adjunct of shaft 80). A preferred form of connection provides means moving with shaft 80, which controls the general operation, to hold the auxiliary pattern safely out of possibility of action during making heels and toes and performing any other structural operation in which pattern operation of the needles is unnecessary or with which pattern operation would interfere. By controlling the intervals of operation of this auxiliary drum from the primary pattern at other times, the pattern can be varied by control from either the chain or a part on shaft 80, or both, and extended throughout every part of the article being made. Links on chain 60 having lugs 63 on their left-hand sides may work a rocker 815 straddling frame A and slide rod 93 and having a pin to receive one end of wire link 816 to one end of lever 817 pivoted on frame A, and provided with a follower 819 for the periphery of a safety cam 820, Figs. 9 and 22, on the end of shaft 80 having high parts corresponding to the heel (or other special knitting operations) and an intermediate part corresponding to the toe and beginning of another stocking permitting drum 791 to be racked to a stop at its low tooth. The other end of lever 817 is connected by wire link 821 to a bell-crank lever 822 on the front face of bed plate B, having one arm bored to receive link 803.

Referring now to Figs. 3, 4, 13 and 14, the machine may have the usual latch guard ring 550 pivoted on a standard at 553 and carrying a transverse stud 554 in upright 555 on which yarn guide fingers 1, 2, 3 and 4 are pivoted for motion downward into operative position within a slot defined by the throat plate F, under the influence of individual springs, as usual. The usual thrust bars 460 actuated by cams on drum 120 may take against the under sides of the fingers 1, 2, 3, 4 for removing any of them upwardly about their pivotal point on stud 554 to withdraw their yarns. Thrust bar 460ª for finger 1, for splicing, may have a lug 460ᵇ to take against a cam segment on the web-holder bed 295 when the thrust bar is lowered, for rocking the bar 460ª outwardly to cause its end to react with a cam lug on said finger 1 to work it to insert and without its yarn at the ends of a segment of the needles less than the whole circle in extent, as usual.

The yarn fingers 5 and 6 for the yarns $y^2$ and $y^3$ respectively are preferably pivoted on the stud 552 placed at a lower and more outward position than the stud 554, and these fingers are provided with tails 15 and 16 upwardly, outwardly and divergently extending beyond pivot 552 to take against stop screws 17 and 18 held by lock-nuts 19 in threaded bores in a stop bracket 20 having an arm with a boss bored to receive one end of stud 554, and bored and threaded for a set screw 21, and having a lug 22 to limit the motion of this part against the upright 555. Springs 553ª hold the fingers 5 and 6 downward to the limit adjusted by the screws 17 and 18 for the active position of the holes for the yarns $y^2$ and $y^3$. In a preferred form the throat plate F is provided with an integral shield 7, Figs. 4 and 14, having a front surface bored out to the same radius as the latch ring 550, to guard the needle latches from closing when at high level $k$. The fingers 5 and 6 may be lifted out of action, for example, during reciprocatory knitting, by individual thrust bars 460ᶜ worked by cams on drum 120.

For making welts and for rib knitting (as for the top $a$ of the stocking of Fig. 1) the usual dial D indicated in Fig. 14 and the usual instruments therein may be a part of the machine and operate as usual.

Figure 5:
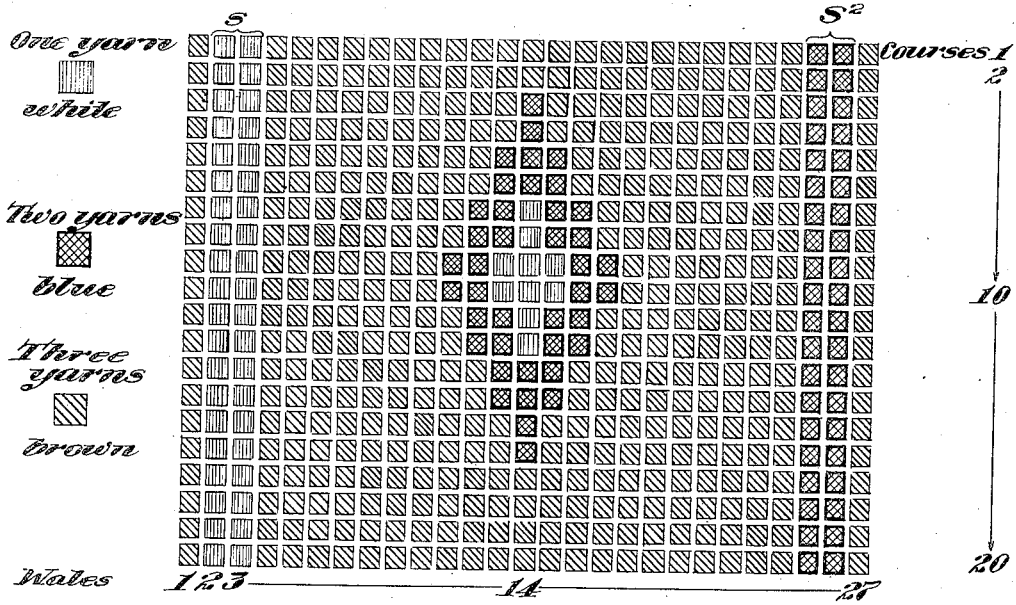
Fig. 5 is a diagrammatic face view of fabric ornamented with the particular kind of pattern shown in Fig. 2 and at $d$, Fig. 1.

In operation, let it be supposed that the stocking made is to be knitted of white, blue and brown yarns and ornamented with the pattern shown in Fig. 1, of which pattern Fig. 5 is an analytical diagram of a fragment only. In the direction of successive courses it is proposed to make, in a fabric predominantly composed of the three-yarn fabric of Fig. 6, of which the brown yarn $y^3$ is the facing yarn, stripes $s$ and $s^2$ respectively of the single-yarn fabric of Fig. 8 and the two-yarn fabric of Fig. 7. If yarn $y^2$ is blue and yarn $y$ white, in the first course needles in wales 2 and 3, for example, are to be selected to knit yarn $y$ only, and needles in wales 25 and 26 to knit yarns $y$ and $y^2$ and float yarn $y^3$ at the back. Therefore selector jacks for the stripe in wales 2 and 3 are provided with butts 702 which can be worked by levers 765 to cause these jacks not to encounter cam 741. These butts may be in the upper part of the space for butts on these jacks, as at $x$, Fig. 11.

For the blue stripe, two adjacent needles, further on in the series, for wales 25 and 26 of Fig. 5, for example, are to have selector jacks with butts which can be worked by a lever 765 to cause the operating butts of these jacks to miss cam 741 and be worked by the ledge cam 742. These butts may be nearer the bottoms of the butt spaces on their selector jacks, as at $v$, Fig. 11.

The auxiliary drum 791 having stopped after prior actuation with its bit $794^a$, Fig. 12, opposite the row of ends 767 of the reader cam levers 765, only that reader lever opposite the depression $d^1$ can be active; if the levers 780 and 781, Fig. 10, have not been released by drum 120, no lever 765 will be released, and no selector jack can fail to be worked by cam 741, and every needle will knit the three-yarn fabric of Fig. 6. When the levers 780 and 781 are released, auxiliary drum 791 still being stationary, if the reader lever 765 corresponding to depression $d^1$ finds no butts on the selector jacks, as shown in Fig. 11, the fabric knit will still consist entirely of the three-yarn fabric of Fig. 6. Assuming the auxiliary drum 791 to be racked every second revolution of the needle-cylinder, on its first motion bit $794^b$ is opposite the ends 797 of the reader levers 765. This bit has two depressions $d^2$, $d^2$, and the two reader levers released by it will encounter the butts 702 at $x$ and at $v$. The reader lever at the upper part of the series is one of those allowed a full stroke inwardly by its stop 768, and the jacks 700 having the butts $x$ will be forced inward to clear cam 741 and cam 742, so the corresponding needles will not rise above level $k^3$, the yarn $y$ at these needles is taken and knit, and the yarns $y^2$ and $y^3$ float at the back of the fabric.

The reader lever 765 released in the plane of the butts $v$ is one of the series opposite the stop 769, and when released by the other depression $d^2$ will be pressed inward to a limit determining through the butts $v$ a position for the jacks 700 having butts $v$ which will cause the jacks to rise on cam 742 to carry their needles to level $k^2$, take the blue plating yarn $y^2$ and yarn $y$, and knit a blue stripe, yarn $y^3$ floating at the back of the fabric.

Drum 791 may be held stationary with bit $794^b$ in control of the reader levers by operation of pawl controller 802 by a lug on chain 60 when desired. Assuming that the drum 791 continues to move step by step, the next bit $794^c$ may have a depression in line with $d^2$ to continue making the white stripes, and a depression $d^3$ to inaugurate the successive actuation of reader levers 765 at its level and three steps downwardly from it to knit the blue parts of the figures $f$, for which the appropriate jacks 700 are provided with the groups of butts at $z$, Fig. 11. In order to continue making the blue stripe, the jacks with butts $v$ may be provided with butts at the same level as each of the butts $z$. As shown, the butts $z$ cover only four spaces vertically; assuming the drum 791 to move every second revolution this provides for eight courses of corresponding actuation of the needles whose jacks have the butts $z$. But the figure $f$ is a symmetrical figure; the widest part having been reached when bit $794^f$ is active, the making of the lower part may be provided for by releasing reader levers in the opposite order to read the series of butts $z$ again in the opposite direction, until the reader lever at the level of $d^3$ is again rocked by a depression in bit $794^i$.

On the progression downwardly of released reader levers for the butts $z$, the needle for the central needle wale of the figure completes the blue element after two steps of the drum 791. The next bit may therefore be provided with a depression $d^4$ in line with the uppermost butt of a group $w$ to swing the jack of the central needle to make the white center of the figure $f$, and the next bit with a depression for a lower reader lever to swing the jacks for flanking needles. In order to maintain the white stripe, the jacks with butts $x$ may have similar butts for any reader lever required to be released to progress down and up again to work the butts $w$ in succession.

If another figure $f$ on different needles is required, as shown, a group of butts $z^2$ on other jacks 700, and a group of butts $w^2$ on the same jacks, each displaced up or down from the series of butts $z$ and $w$ respectively, may be provided for actuation by other groups of reader levers 765 when released by appropriate depressions in bits 794 at another part of the periphery of drum 791, as shown at $d^{10}$ and $d^{11}$, Fig. 12. To maintain the stripes, butts corresponding to the butts $x$ and $v$ on the same jacks are provided to be read by the levers released by the depressions $d^{10}$ and $d^{11}$.

It will be observed that any three-color pattern within the capacity of the vertical height of the series of butts 702, the whole lateral extent of the needles and selector jacks, and any order of actuation during a number of courses corresponding to the number of bits 794 on the drum 791 as actuated and controlled in time with the machine operation may be provided for by these arrangements.

It will also be observed that operation of the plates 779, $779^a$ by levers 780 and 781 may provide for selectively stopping out of the pattern for any number of courses either the two-yarn or the one-yarn fabric elements of this pattern. The upper fraction of the series of levers 765 is controlled by the plate 779, and the lower fraction by plate $779^a$, so that operation of either of these will substitute for the pattern which would have been controlled by these levers fabric of the three-yarn structure. Operation of lever 780, for example, at intervals of those courses which would contain one series of the figures $f$, results in knitting these figures without white centers, and omitting the white stripes in the same courses. Operation of lever 781 has the same effect on the blue elements of the pattern; operating both levers eliminates the pattern.

If, during operation of the patterning devices, the body yarn is exchanged by operation of yarn-changing fingers so as to feed another color of body yarn, for example from finger 3, finger 2 being withdrawn, the substituted color of the yarn y, now fed from finger 3, will appear in those parts of the pattern knit by the body yarn only.

I claim:

1. In a knitting machine, a needle carrier and needles therein, selector jacks for the needles capable of longitudinal and lateral movement in respect to said carrier, an operating butt and a space for selector butts on said jacks, in combination with a jack advancing cam having portions of different heights at different distances from said carrier, series of spring-actuated reader levers adapted to encounter series of said selector butts, and a stop for said reader levers limiting their motion to a position at which a jack having a selector butt encountering said reader lever is moved in its carrier to encounter one portion of said advancing cam and miss another portion of said advancing cam.

2. In a knitting machine, a needle carrier and needles therein, selector jacks for the needles capable of longitudinal and lateral movement in respect to said carrier, an operating butt and a space for selector butts on said jacks, in combination with a jack advancing cam having portions of different heights at different distances from said carrier, series of spring-actuated reader levers adapted to encounter series of said selector butts, and a stop for said reader levers limiting their motion to a position at which a jack having a selector butt encountering said reader lever is moved in its carrier to encounter one portion of said advancing cam and miss another portion of said advancing cam, and a pattern device for releasing said reader levers in predetermined order.

3. In a knitting machine, a needle carrier and needles therein, selector jacks for the needles capable of longitudinal and lateral movement in respect to said carrier, an operating butt and a space for selector butts on said jacks, in combination with a jack advancing cam having portions of different heights at different distances from said carrier, series of spring-actuated reader levers adapted to encounter series of said selector butts, and a stop for one series of said reader levers limiting their motion to a position at which a jack having a selector butt encountering said reader lever is moved in its carrier to encounter one portion of said advancing cam and miss another portion of said advancing cam.

4. In a knitting machine, a needle carrier and needles therein, selector jacks for the needles capable of longitudinal and lateral movement in respect to said carrier, an operating butt and a space for selector butts on said jacks, in combination with a jack advancing cam having portions of different heights at different distances from said carrier, series of spring-actuated reader levers adapted to encounter series of said selector butts, and a stop for one series of said reader levers limiting their motion to a position at which a jack having a selector butt encountering said reader lever is moved in its carrier to encounter one portion of said advancing cam and miss another portion of said advancing cam, and a stop for another series of said levers permitting motion to cause jacks operated by them to miss contact with said cam, and a pattern device for releasing said reader levers in predetermined order.

5. In a circular knitting machine for knitting patterned fabrics, a grooved needle carrier and needles, selector jacks for the needles having radial and longitudinal freedom of motion in the needle grooves, means for selecting needles, comprising means for positioning all of the jacks downwardly and outwardly, selector butts on said selector jacks, a series of reader levers each adapted when released to move a jack having a butt inwardly in its carrier, a pattern surface adapted to release said levers in any predetermined order, cam means for advancing selector jacks according to the radial position of said jacks, and stops for respective series of said reader levers predetermining respectively a released position adapted to push the jacks all the way in and a released position adapted to push the jacks partly inward.

6. In a circular knitting machine for knitting patterned fabrics, a grooved needle carrier and needles, selector jacks for the needles having radial and longitudinal freedom of motion in the needle grooves, means for selecting needles comprising means for positioning all of the jacks downwardly and outwardly, selector butts on said selector jacks, a series of reader levers each adapted when released to move a jack having a butt inwardly in its carrier, a pattern surface adapted to release said levers in any predetermined order, cam means for advancing selector jacks according to the radial position of said jacks, and stops for respective series of said reader levers predetermining respectively a released position adapted to push the jacks all the way in and a released position adapted to push the jacks partly inward, in combination with pattern-actuated stop devices adapted to hold one or the other or both of said series of reader levers against release during predetermined times.

7. In a circular knitting machine for knitting patterned fabrics of the superficial color of any of a multiplicity of yarns, a grooved needle carrier and needles, selector jacks for the needles having radial and longitudinal freedom of motion in the needle grooves, and means for feeding the multiplicity of yarns severally from different positions to be taken cumulatively by needles at different elevations in plating relation, said yarns floating at the back of the fabric when not taken, means for selecting needles to take one, less than all, or all, of said yarns comprising means for positioning all of the jacks downwardly and outwardly, selector butts on said selector jacks, a series of reader levers each adapted when released to move a jack having a butt inwardly in its carrier, a pattern surface adapted to release said levers in any predetermined order, cam means for advancing selector jacks according to the radial position of said jacks, and stops for respective series of said reader levers predetermining respectively a released position adapted to push the jacks all the way in and a released position adapted to push the jacks partly inward.

8. Knitting machine having therein, in combination, needles and withdrawing means adapted to move the needles from an advanced to a retracted position to knit, means for advancing the needles to a normal level prior to each actuation by said withdrawing means, means for advancing selected needles to respectively different further extents, selector means for controlling operative relation between each of the needles and said means for advancing the needles through different extents to determine the extent of advance of any needle, said selector means comprising jacks, each having a plurality of series of butts or butt spaces, the number of said series corresponding to the different extents of further adcapable of advancing the needles, during each passage of the needles past said cam means, to a normal yarn-taking level such that all needles of said level take yarn from the feeding means, the yarn feeding means being constructed and arranged to feed a multiplicity of yarns and having more than two yarn delivery orifices disposed respectively at a normal feed level and at a plurality of supernormal feed levels above the normal level, and selecting devices operative to select and to advance said needles to any of a plurality of different yarn-taking levels above said normal yarn-taking level, said selecting devices including needle jacks, each jack having butts disposed at different levels, there being at least as many of said butts as there are supernormal yarn-taking levels, and pattern-controlled selector elements cooperable with jack butts at each of said levels, the cam means comprising parts operative to withdraw the advanced needles to knit and to clear the needle latches through the previous loops.

15. A knitting machine having therein, in combination, a series of hooked needles, a stitch cam, more than two yarn guides positioned ahead of said stitch cam in relation to each other to deliver a multiplicity of yarns at different levels, respectively, into the hooks of needles positioned to receive them, in plating relation to each other, in combination with a cam adapted to advance the needles to a normal level such that they take one of said yarns, and automatic selecting devices acting on the needles to predetermine, for each individual course, selective advancing motions of said needles severally to different supernormal yarn-taking levels, thereby to cause such further advanced needles to take greater numbers of said yarns according to the different extents respectively of their said advance, said selecting devices including needle jacks and jack controlling elements spaced longitudinally of the jacks, there being at least one of said controlling elements to correspond to each of the supernormal yarn-taking levels.

16. Knitting machine having therein in combination a series of hooked latch needles, a stitch cam, more than two yarn guides positioned ahead of said stitch cam in relation to each other to deliver a multiplicity of yarns into the hooks of needles positioned to receive them in plating relation to each other, in combination with means for advancing the needles to clear their latches and to return them to normal level, a cam adapted to advance the needles to take one of said yarns, and automatic selector means acting on the needles to predetermine, for each individual course, selective advancing motions of said needles severally to different further extents to cause said further advanced needles to take greater numbers of said yarns according to the different extents, respectively, of their said advance, said selector means comprising an auxiliary needle elevating cam, jacks, each having a plurality of selector butts, said elements corresponding to the different further extents to which the needles are to be advanced, and a selector device corresponding to each of said selector elements of a jack and cooperating therewith to determine the position of a jack with respect to the auxiliary needle elevating cam.

17. Knitting machine of the kind having a series of hooked needles, a needle carrier, stitch cams for rotary and reciprocatory knitting and means for removing the leading stitch cam during rotary knitting, in combination with more than two yarn guides positioned ahead of the following stitch cam for rotary knitting in relation to each other to deliver a multiplicity of yarns into the hooks of needles positioned to receive them in plating relation to each other, in combination with a cam adapted to advance the needles to take one of said yarns, and automatic selector means acting on the needles to predetermine, for each individual course, selective advancing motions of said needles severally to different further extents to cause said further advanced needles to take greater numbers of said yarns according to the different extents, respectively, of their said advance, said selector means comprising a plurality of selector devices each movable toward and from the needle carrier always in substantially the same horizontal plane, and a selector jack corresponding to each needle, each jack having a plurality of selector elements each respectively cooperable with the same one of said selector devices.

18. In a knitting machine having a rotary needle carrier and needles therein, the combination with the needles of selector jacks in said needle carrier having operating butts, an advancing cam for said jacks having portions at different distances from said needle carrier of different heights, and means, including a normally stationary pattern controlled element past which the selector jacks travel as the cylinder rotates, acting severally on said jacks for moving their operating butts radially in respect to said carrier to cause them to encounter one or the other portion of said advancing cams during relative motion between said carrier and jack advancing cam.

19. In a knitting machine having a rotary needle carrier and needles therein, the combination with the needles, of rocking selector jacks in said needle carrier having operating butts, an advancing cam for said jacks having portions at different distances from said needle carrier of different heights, and means, including a cam member which, by relative circumferential movement of said jacks and cam member, acts severally on said jacks for rocking them to move their operating butts radially inward in respect to said carrier to cause them to encounter one or the other portion of said advancing cam during relative motion between said carrier and jack advancing cam.

20. In a knitting machine having a needle carrier and needles therein, the combination with the needles, of selector jacks in said needle carrier having operating butts, an advancing cam for said jacks having portions at different distances from said needle carrier of different heights, and a cam element acting successively and severally on said jacks for moving their operating butts radially inward with respect to said carrier to cause them to encounter one or the other portion of said advancing cam during relative motion between said carrier and jack advancing cam, and other means for severally moving said jacks radially inward in their carrier sufficiently far to cause their operating butts to miss contact with said jack advancing cam.

21. In a knitting machine having a needle carrier and needles therein, the combination with the needles, of rocking selector jacks in said needle carrier having operating butts and a plurality of selector butts, an advancing cam for said jacks having portions at different distances from said needle carrier of different heights, and cam elements cooperable with the respective sevance of the needles; means for feeding yarn to the needles at said normal level, and means for feeding different yarns to needles advanced to different extents, respectively beyond said normal level prior to their retraction to knit.

9. Knitting machine having therein, in combination, needles and cams adapted to move the needles from an advanced to a retracted position to knit, means for advancing the needles to a normal level prior to each actuation by said cams, means for advancing selected needles to respectively different levels above said normal level, selector means for controlling operative relation between each of the needles and said means for advancing the needles above said normal level to determine the extent of advance of any needle for the formation of each individual course, said selector means comprising jacks each having a plurality of series of butts or butt spaces, the number of said series corresponding to the different extents of further advance of the needles, and selector devices cooperating with each of said series to determine the position of the jacks with respect to the needle advancing means; means for feeding yarn to the needles at said normal level, and means for feeding different yarns respectively to needles advanced to different extents prior to their retraction to knit.

10. Knitting machine having therein, in combination, needles and withdrawing means adapted to move the needles from an advanced to a retracted position to knit, means for advancing the needles to a normal level prior to each actuation by said withdrawing means, means for advancing selected needles to respectively different further extents, selector means for controlling operative relation between each of the needles and said means for advancing the needles through different further extents to determine the extent of advance of any needle for the formation of each individual course, said selector means comprising jacks each having a plurality of selector elements, said elements corresponding to the different further extents to which the needles are to be advanced; means for feeding a body yarn to all of the needles at said normal level, and means for feeding different yarns to all of the needles advanced to or beyond each of said different further extents prior to their retraction to knit.

11. A knitting machine having therein, in combination, a series of needles, needle actuating cam means, yarn feeding means, and means operative repeatedly to move the series of needles past the cam means and the yarn feeding means for the formation of course after course of knitted loops, said cam means comprising a cam capable of advancing the needles, during each passage of the needles past said cam means, to a normal yarn-taking level such that all needles at said level take yarn from the feeding means, the yarn feeding means comprising a series of yarn guides for feeding a multiplicity of yarns, said guides providing yarn delivery orifices at a normal feed level and at a plurality of supernormal feed levels above said normal level, and needle positioning means operative to select certain needles for advance to any of a plurality of different supernormal yarn-taking levels above said normal yarn-taking level, said needle positioning means comprising at least as many selector devices as there are supernormal yarn-taking levels and a plurality of positioning elements associated with each needle and cooperable with the several selector devices to determine the advance of a needle to one or another of said supernormal yarn-taking levels.

12. A knitting machine having therein, in combination, a series of needles, needle actuating cam means, yarn feeding means, and means operative repeatedly to move the series of needles past the cam means and the yarn feeding means for the formation of course after course of knitted loops, said cam means comprising a cam capable of advancing the needles, during each passage of the needles past said cam means, to a normal yarn-taking level such that all needles at said level take yarn from the feeding means, the yarn feeding means having a series of yarn delivery orifices disposed respectively at a normal feed level and at a plurality of supernormal feed levels above said normal level, automatic needle positioning means acting on the needles prior to each passage of the needles past said yarn guides, said needle positioning means being operative to select, to be advanced and to advance predetermined needles to one or another of a plurality of different yarn-taking levels above the normal yarn-taking level, said needle positioning means comprising a plurality of selector devices movable toward and from the needle carrier, and a selector jack corresponding to each needle, each jack having a plurality of selector elements cooperable with the respective selector devices, the several selector devices and the corresponding selector elements of the jacks being operative to move the jacks to different distances, respectively, toward the needle carrier, thereby to determine the advance of a needle to one or another of the several yarn-taking levels, the cam means being operative to withdraw the advanced needles to knit.

13. A knitting machine having therein, in combination, a series of needles, needle actuating cam means, yarn feeding means, and means operative repeatedly to move the series of needles past the cam means and the yarn feeding means for the formation of course after course of knitted loops, said cam means comprising a cam capable of advancing the needles, during each passage of the needles past said cam means, to a normal yarn-taking level such that all needles at said level take yarn from the feeding means, the yarn feeding means having more than two delivery orifices disposed respectively at a normal feed level and at supernormal feed levels above said normal level, each needle having associated therewith a jack adapted to rock toward and from the needle carrier, each jack having an operating butt and a plurality of selector butts, said several selector butts corresponding respectively to a plurality of supernormal yarn-taking levels above the normal level, automatic needle positioning means acting on the needles during each course prior to passage of the needles past the cam means and said yarn guides, said needle positioning means being operative to select, to be advanced and to advance any predetermined needle to one or the other of said supernormal yarn-taking levels and comprising devices cooperable with one or another of the several jack butts respectively to rock the corresponding jack to different distances, thereby to determine the distance to which the corresponding needle shall be advanced.

14. A knitting machine having therein, in combination, a series of needles, needle actuating cam means, yarn feeding means, and means operative repeatedly to move the series of needles past the cam means and the yarn feeding means for the formation of course after course of knitted loops, said cam means comprising a cam lector butts of the jacks, said cam elements acting severally on said jacks for rocking them to move their operating butts in respect to said carrier to cause them to encounter one or the other portion of said advancing cam during relative motion between said carrier and jack advancing cam in accordance with the engagement of one or another of said cam elements with a jack selector butt, and means acting on the jacks severally to rock them to cause their operating butts to miss contact with said jack advancing cam.

22. In a knitting machine, a grooved needle carrier and needles therein, a series of selector jacks for the needles adapted for motion in two dimensions in said needle grooves, means for positioning said jacks at an extreme of their freedom of motion in both of said dimensions during each course knit, in combination with a pair of pattern controlled cam elements, which when in operative position are disposed at different distances respectively from the needle carrier, said cam elements, when in operative position, acting respectively to move certain of said jacks in one of said dimensions selectively to one or the other of two different positions within said extreme according to the operative positioning of one or another of said cam elements by a pattern, and cam means reacting with said jacks according to their position to move them and their needles through one of two different extents of motion in the direction of the length of the needles.

23. In a circular knitting machine, a grooved rotary needle cylinder and needles therein, a series of selector jacks for the needles adapted for motion longitudinally and radially of said needle grooves, in combination with a cam having portions of different extents displaced from each other radially of the cylinder for moving said jacks longitudinally of the cylinder, means to position each of said jacks in said carrier to encounter said cam, and pattern operated jack actuating elements which do not rotate in consonance with the needle cylinder, said elements being capable of reacting severally with each jack and adapted to move a jack to position to encounter one portion of said cam, or to position to miss said cam.

24. In a knitting machine, a grooved needle carrier and needles therein, a series of selector jacks for the needles adapted for motion in two dimensions in said needle grooves, in combination with a cam having portions disposed at different distances from the needle carrier for moving said jacks longitudinally of their grooves, means operative to move each of said jacks outward in its groove to a position to encounter said cam, spring-pressed pattern operated connections capable of reacting severally with each jack adapted when released to move a jack toward the needle carrier to a position to encounter one portion only of said cam or to position wholly to miss said cam, and a stop for a series of said connections limiting their motion to said first position.

25. In a knitting machine, a needle carrier and needles therein, selector jacks for the needles capable of longitudinal and lateral movement in respect to said carrier, an operating butt and a space for selector butts on each of said jacks, a jack advancing cam having portions of different heights at different distances respectively from said carrier, means positioning all of the jacks as they approach said cam so that their operating butts move in a path to engage that portion of the advancing cam which is more remote from the carrier, and jack selector means adapted to cooperate with selector jack butts at different levels respectively, the jack selector means being operative by contact with a selected jack butt to move the corresponding jack into the carrier so that its operating butt encounters only that portion of the advancing cam which is next to the carrier, or wholly misses said cam, respectively.

26. In a knitting machine, a needle carrier and needles therein, selector jacks for the needles capable of longitudinal and lateral movement in respect to said carrier, an operating butt and a space for selector butts on each of said jacks, a jack advancing cam having portions of different heights at different distances from said carrier and a plurality of jack selector devices corresponding to the several cam portions respectively, the several jack selector devices being operative to move a jack in its carrier so that its operating butt encounters a selected portion only of the jack advancing cam, or wholly misses said cam, respectively.

27. In a knitting machine, a needle carrier and needles therein, selector jacks for the needles capable of longitudinal and lateral movement in respect to said carrier, an operating butt and a space for selector butts on each of said jacks, a jack advancing cam having portions of different heights at different distances from said carrier, groups of movable jack selector cam elements corresponding to the several cam portions respectively, said groups being always disposed at substantially the same distances from the jack selector cam, and pattern controlled means operative to move the several jack selector cam elements to operative positions differently spaced respectively from the needle carrier, one of said cam elements when in operative position so moving jacks that their operative butts encounter one portion only of the jack selector cam, and another of said cam elements when in operative position so moving jacks that their operative butts wholly miss the cam.

28. In a knitting machine, a needle carrier and needles therein, selector jacks for the needles capable of longitudinal and lateral movement in respect to said carrier, an operating butt and a space for selector butts on each of said jacks, a jack advancing cam having portions of different heights at different distances from said carrier, a plurality of movable jack selector devices corresponding to the several cam portions respectively, pattern controlled means for moving said devices toward the needle carrier, and stop elements so arranged as to limit movement of the respective selector devices to different distances respectively from the needle carrier, said selector devices when in their innermost positions, as determined by their corresponding stops, being operative, respectively, so to position the operative butts of jacks as to cause said butts to encounter a selected portion only of the cam or wholly to miss the cam.

HARRY N. SHEPPARD.